United States Patent
Katsuta

(10) Patent No.: US 9,482,129 B2
(45) Date of Patent: Nov. 1, 2016

(54) VEHICULAR CONTROL DEVICE AND VEHICULAR CONTROL METHOD

(75) Inventor: Hiroshi Katsuta, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/117,174

(22) PCT Filed: Jun. 2, 2011

(86) PCT No.: PCT/JP2011/062677
§ 371 (c)(1),
(2), (4) Date: Nov. 12, 2013

(87) PCT Pub. No.: WO2012/164715
PCT Pub. Date: Dec. 6, 2012

(65) Prior Publication Data
US 2014/0290216 A1   Oct. 2, 2014

(51) Int. Cl.
| | | |
|---|---|---|
| F01N 3/00 | (2006.01) |
| F01N 3/10 | (2006.01) |
| F01N 3/20 | (2006.01) |
| B60K 6/445 | (2007.10) |
| B60W 10/06 | (2006.01) |
| B60W 10/30 | (2006.01) |
| F02D 41/10 | (2006.01) |
| F02D 41/02 | (2006.01) |
| F02D 41/06 | (2006.01) |

(52) U.S. Cl.
CPC ............ *F01N 3/2013* (2013.01); *B60K 6/445* (2013.01); *B60W 10/06* (2013.01); *B60W 10/30* (2013.01); *B60W 20/16* (2016.01); *F02D 41/10* (2013.01); *B60W 2540/103* (2013.01); *B60Y 2300/474* (2013.01); *F02D 41/024* (2013.01); *F02D 41/064* (2013.01); *F02D 2200/0802* (2013.01); *Y02T 10/26* (2013.01); *Y02T 10/54* (2013.01); *Y02T 10/6239* (2013.01)

(58) Field of Classification Search
CPC ............................................... B60W 2540/103
USPC ........................................................ 180/65.21
See application file for complete search history.

(56) References Cited

U.S. PATENT DOCUMENTS

| | | | |
|---|---|---|---|
| 5,904,902 A | 5/1999 | Matuoka et al. | |
| 5,973,460 A | 10/1999 | Taga et al. | |
| 2002/0092295 A1 | 7/2002 | Suzuki et al. | |
| 2003/0172643 A1* | 9/2003 | Suzuki | ............................ 60/284 |
| 2004/0006414 A1* | 1/2004 | Suzuki | ............................ 701/22 |

FOREIGN PATENT DOCUMENTS

| | | |
|---|---|---|
| JP | 9-125943 | 5/1997 |
| JP | 9-266601 | 10/1997 |
| JP | 10-89053 | 4/1998 |
| JP | 10-238381 | 9/1998 |
| JP | 2002-285878 | 10/2002 |
| JP | 2006-250134 | 9/2006 |
| JP | 2009-35226 | 2/2009 |
| JP | 2009-286337 | 12/2009 |

* cited by examiner

*Primary Examiner* — Audrey K Bradley
*Assistant Examiner* — Jason Sheppard
(74) *Attorney, Agent, or Firm* — Finnegan, Henderson, Farabow, Garrett & Dunner, LLP

(57) ABSTRACT

In a vehicle including an engine, an electrically heatable catalyst device (EHC), and a first motor generator that generates electric power in accordance with the engine's motive power with the vehicle in a substantially stopped state with a vehicular speed lower than a threshold vehicular speed, an ECU determines, based on an amount A by which an accelerator pedal is operated and a vehicular speed V, whether a large accelerator operation has been performed with the vehicle in the substantially stopped state. If the ECU determines that the large accelerator operation has been performed with the vehicle in the substantially stopped state, the ECU activates an energization timer, and before the energization timer reaches a reference energization period of time α, the ECU energizes the EHC, and once the energization timer has reached the reference energization period of time α, the ECU ceases energizing the EHC.

5 Claims, 4 Drawing Sheets

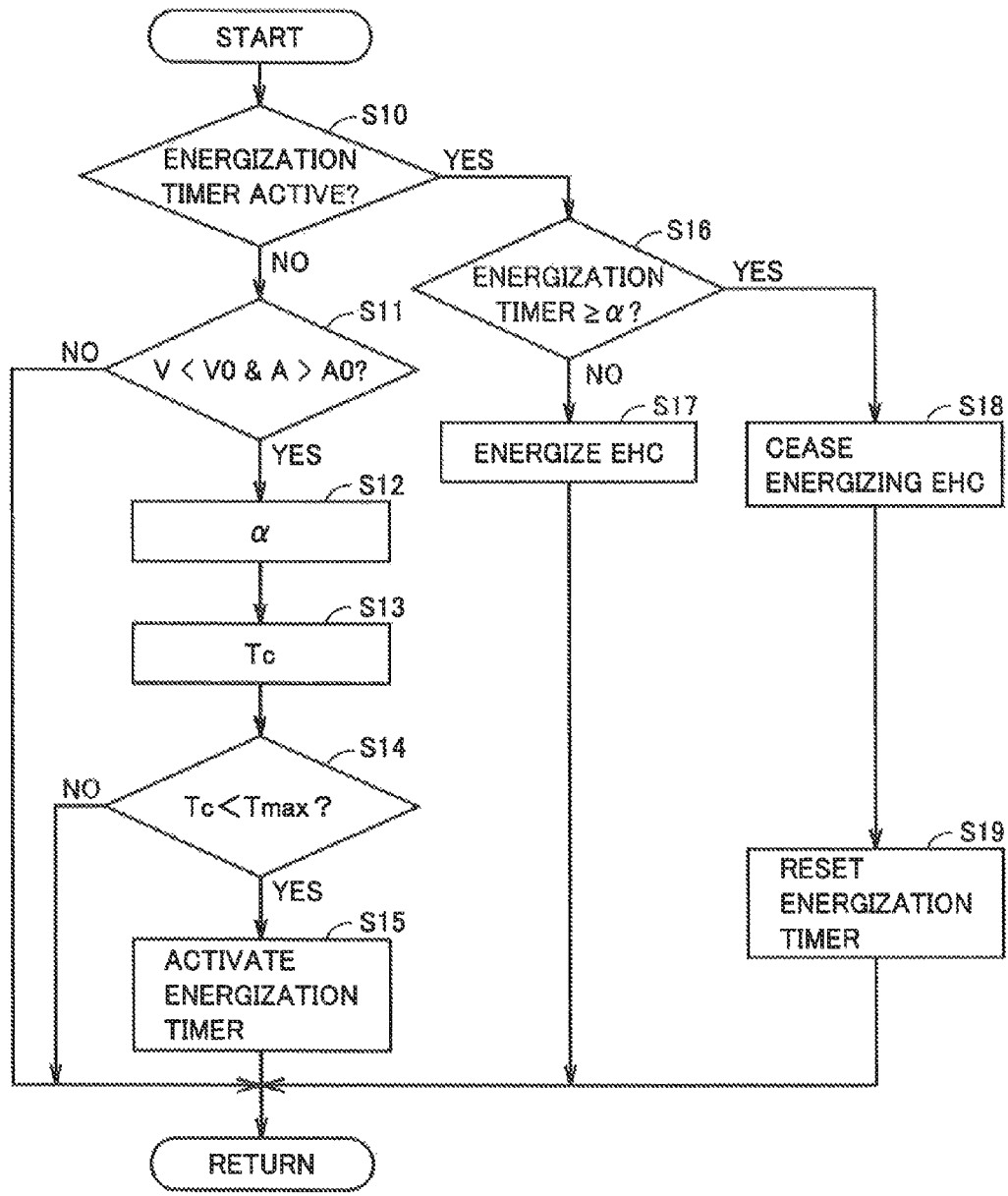

VEHICULAR CONTROL DEVICE AND VEHICULAR CONTROL METHOD

CROSS-REFERENCE TO REALATED APPLICATIONS

This application is a nation phase of International Application No. PCT/JP2011/062677, filed Jun. 2, 2011, the content of which is incorporated herein by reference.

TECHNICAL FIELD

The present invention relates controlling a vehicle equipped with an electrical heated catalyst (hereinafter also referred to as an "EHC") to purify an engine's exhaust gas.

BACKGROUND ART

An engine equipped vehicle is generally equipped with a catalyst to purify the engine's exhaust gas. When the catalyst does not reach a temperature that allows the catalyst to be activated, the catalyst cannot purify the exhaust gas sufficiently. Accordingly, conventionally, there has been proposed an EHC having a catalyst configured to be electrically heatable by an electric heater or the like.

Japanese Patent Laying-Open No. 2009-035226 (PTD 1) discloses that in a hybrid vehicle having an engine, an EHC, a motor generator, and a battery, when it is determined from the force required to drive the vehicle and the battery's current state of charge that it is necessary to drive the engine, the EHC is supplied with electric power and thus heated based on the force required to drive the vehicle, the battery's current state of charge, and the temperature of each component of the engine.

CITATION LIST

Patent Documents

PTD 1: Japanese Patent Laying-Open No. 2009-035226
PTD 2: Japanese Patent Laying-Open No. 2009-286337
PTD 3: Japanese Patent Laying-Open No. 10-238381
PTD 4: Japanese Patent Laying-Open No. 2002-285878

SUMMARY OF INVENTION

Technical Problem

A vehicle equipped with an electric power generator generating electric power by an engine's motive power for example in starting the vehicle normally charges the electric power that the electric power generator generates to the battery. If the user performs an accelerator operation significantly larger than normal and in response the engine's motive power is rapidly increased, however, the electric power generator also generates electric power in a rapidly increased amount resulting in exceeding electric power receivable by the battery. On the other hand, limiting the engine's motive power to reduce the electric power that the electric power generator generates will prevent the vehicle from exhibiting the force requested by the user to drive it.

The present invention has been made to overcome the above issue, and it contemplates preventing a vehicle including an engine, an electrically heatable catalyst device (EHC) and a rotating electric machine capable of generating electric power in accordance with the engine's motive power from having impaired motive power performance.

Solution to Problem

The present invention provides a control device controlling a vehicle including an engine, an electrically heatable catalyst device purifying exhaust gas of the engine, and a first rotating electric machine. The first rotating electric machine generates electric power in accordance with motive power of the engine for a low speed state with a vehicular speed being a speed lower than a first vehicular speed. The control device includes: a switching device switching an electrical connection state of the first rotating electric machine and the catalyst device; and an energization control unit controlling the switching device to control energizing the catalyst device. The energization control unit energizes the catalyst device for a predetermined period of time when the vehicle starts up a hill or in the low speed state an accelerator is operated in an amount exceeding a threshold amount to perform a large accelerator operation.

Preferably, when the vehicle starts up a hill or in the low speed state the large accelerator operation is performed, the energization control unit estimates a temperature of a catalyst attained when the catalyst device is energized for a reference period of time, and if the catalyst attains a temperature lower than a tolerable temperature, the energization control unit energizes the catalyst device, whereas if the catalyst attains a temperature exceeding the tolerable temperature, the energization control unit avoids energizing the catalyst device.

Preferably, the vehicle further includes a second rotating electric machine coupled with a driving shaft and having a rotational speed proportional to the vehicular speed. The reference period of time is a period of time estimated to be required to allow the vehicular speed to reach a second vehicular speed from the speed lower than the first vehicular speed. The second vehicular speed is set to a value for which it is estimated that it is unnecessary to pass electric power that is generated by the first rotating electric machine to the catalyst device as the electric power generated by the first rotating electric machine is consumable by the second rotating electric machine.

Preferably, the vehicle further includes a power storage device capable of transmitting and receiving electric power to and from the first rotating electric machine. When the vehicle starts up a hill or in the low speed state the large accelerator operation is performed, and the power storage device also has a receivable electric power value smaller than a threshold electric power value, the energization control unit energizes the catalyst device.

Preferably, the vehicle further includes a planetary gear device including a ring gear coupled with a driving shaft, a sun gear coupled with the first rotating electric machine, a pinion gear engaging with the sun gear and the ring gear, and a carrier coupled with the engine and supporting the pinion gear rotatably.

The present invention in another aspect provides a control method performed by a control device for a vehicle including an engine, an electrically heatable catalyst device purifying exhaust gas of the engine, a first rotating electric machine coupled with the engine, and a switching device switching a connection state of the first rotating electric machine and the catalyst device. The first rotating electric machine generates electric power in accordance with motive power of the engine for a low speed state with a vehicular speed being a speed lower than a first vehicular speed. The method includes the steps of: determining whether the vehicle starts up a hill or whether in the low speed state an accelerator is operated in an amount exceeding a threshold amount to perform a large accelerator operation; and controlling the switching device to energize the catalyst device for a predetermined period of time when the vehicle starts up a hill or in the low speed state the large accelerator operation is performed.

Advantageous Effects of Invention

The present invention can thus prevent a vehicle including an engine, an EHC and a rotating electric machine capable of generating electric power in accordance with the engine's motive power from having impaired motive power performance.

BRIEF DESCRIPTION OF DRAWINGS

FIG. 5 is a flowchart to represent a procedure of a process performed by the ECU.

DESCRIPTION OF EMBODIMENTS

Figure 1:
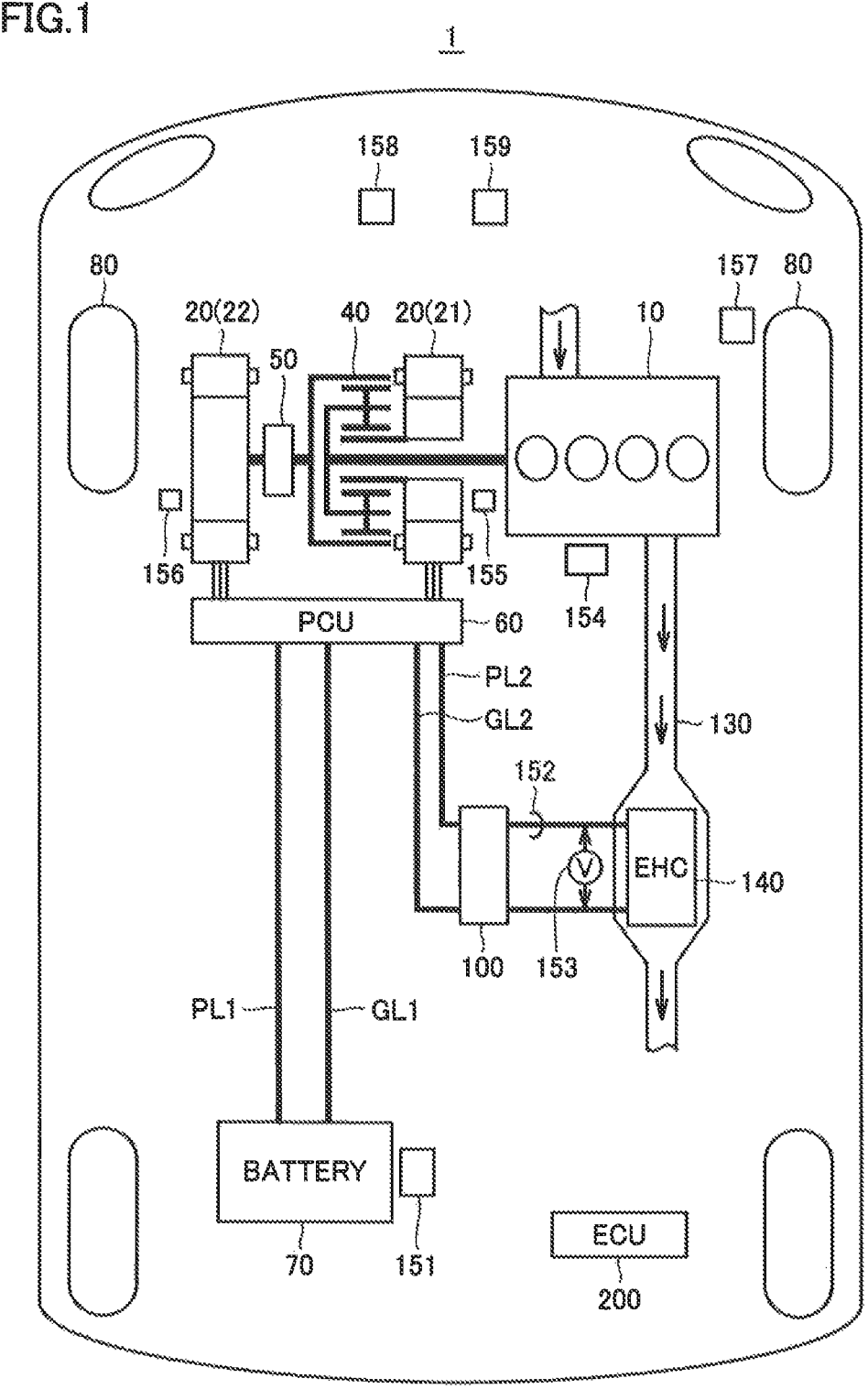
FIG. 1 is a general block diagram of a vehicle.

An embodiment of the present invention will be described hereinafter in detail with reference to the drawings. In the drawings, identical or corresponding components are identically denoted and will not be described repeatedly.

FIG. 1 is a general block diagram of a vehicle 1 according to an embodiment of the present invention. Vehicle 1 includes an engine 10, a motor generator (MG) 20, a power split device 40, a speed reducer 50, a power control unit (PCU) 60, a battery 70, a driving wheel 80, and an electronic control unit (ECU) 200.

Engine 10 generates driving force for rotating a crankshaft by combustion energy generated when an air-fuel mixture taken into a combustion chamber is combusted. Timing to ignite engine 10, an amount of fuel to be injected, an amount of air to be taken in, and the like are controlled in response to a control signal issued from ECU 200.

MG 20 includes a first MG 21 and a second MG 22. First MG 21 and second MG 22 are ac rotating electric machines, and they are for example three-phase ac synchronous electric motors. Note that in the following description when it is unnecessary to distinguish first MG 21 and second MG 22 they will simply be described as MG 20.

Vehicle 1 is a hybrid vehicle traveling with driving force output from at least one of engine 10 and second MG 21. Engine 10 generates driving force which is in turn split for two paths by power split device 40. More specifically, one is a path for transmission via speed reducer 50 to driving wheel 80, and the other is a path for transmission to first MG 21.

Power split device 40 is formed of a planetary gear including a sun gear, a pinion gear, a carrier, and a ring gear. The pinion gear engages with the sun gear and the ring gear. The carrier supports the pinion gear to allow rotation on its axis, and is coupled to the crankshaft of engine 10. The sun gear is coupled with the rotation shaft of first MG 21. The ring gear is coupled with a rotation shaft of second MG 22 and speed reducer 50. As engine 10 and first MG 21 and second MG 21 are coupled to one another through power split device 40 formed of the planetary gear, engine speed Ne, first MG rotation speed Nm1 and second MG rotation speed Nm2 satisfy a relation connected by a straight line in a nomographic chart (see FIG. 2, which will be described later).

PCU 60 and battery 70 are connected by a positive electrode line PL1 and a negative electrode line GL1. PCU 60 operates in response to a control signal received from ECU 200 to control electric power supplied to MG 20 from battery 70 or electric power supplied to battery 70 from MG 20. Battery 70 stores electric power therein for driving MG 20. Battery 70 is representatively a nickel hydride battery, a lithium ion battery or a similar dc rechargeable battery. Battery 70 outputs a voltage of approximately 200 V, for example. Note that battery 70 may be replaced with a capacitor of large capacity.

Engine 10 emits exhaust gas which is in turn discharged to the air through an exhaust path 130 provided under the floor of vehicle 1. Exhaust path 130 extends from engine 10 to a rear end of vehicle 1.

Exhaust path 130 has an intermediate portion provided with an electrical heated catalyst (EHC) 140. EHC 140 is configured including a catalyst purifying exhaust gas and a heater configured to be capable of electrically heating the catalyst. It is to be noted that various known configurations can be applied to EHC 140.

PCU 60 and EHC 140 are connected by a positive electrode line PL2 and a negative electrode line GL2. EHC 140 receives via PCU 60 electric power from battery 70 and electric power generated by MG 20. Positive electrode line PL2 and negative electrode line GL2 are provided with an EHC power supply 100. Note that battery 70 and EHC 140 may be connected in a relationship other than shown in FIG. 1.

EHC power supply 100 has a relay incorporated therein and is operative in response to a control signal received from ECU 200 to electrically connect/disconnect EHC 140 and PCU 60. When EHC power supply 100 has its internal relay closed, EHC 140 and PCU 60 are connected to energize the heater in EHC 140 (hereinafter also referred to as "energizing the EHC"). As the EHC is energized, the catalyst in EHC 140 is warmed up. When EHC power supply 100 has its internal relay opened, EHC 140 and PCU 60 are disconnected to stop energizing the EHC. ECU 200 thus controls EHC power supply 100 to control an amount of energization for the heater in EHC 140.

Furthermore, vehicle 1 includes a monitoring unit 151, a current sensor 152, a voltage sensor 153, a rotational speed sensor 154, resolvers 155, 156, a vehicular speed sensor 157, an accelerator pedal position sensor 158, and an acceleration sensor 159.

Monitoring unit 151 monitors a state of battery 70 (battery current Ib, battery voltage Vb, battery temperature Tb, and the like). Current sensor 152 senses current Ic passing through EHC 140. Voltage sensor 153 senses voltage Vc applied to EHC 140. Rotational speed sensor 154 senses engine speed Ne. Resolvers 155 and 156 sense rotational speed Nm1 of first MG 21 and rotational speed Nm2 of second MG 22, respectively. Vehicular speed sensor 157 senses vehicular speed V. Accelerator pedal position sensor 158 senses an amount A by which the accelerator pedal is operated by the user. Acceleration sensor 159 senses acceleration (including gravitational acceleration) G acting on vehicle 1. The results sensed by these units and sensors are input to ECU 200.

ECU 200 has a central processing unit (CPU) and a memory (not shown) incorporated therein, and performs a predetermined operation process based on a map and a program stored in the memory and a result sensed by each sensor and controls each device so that vehicle 1 has a desired state for a result of the operation process.

ECU 200 sets an electric power value Win (in watts) receivable by battery 70 depending on battery temperature Tb or the like, and controls electric power that battery 70 actually receives not to exceed receivable electric power value Win. This reduces/prevents degradation of battery 70.

Figure 2:
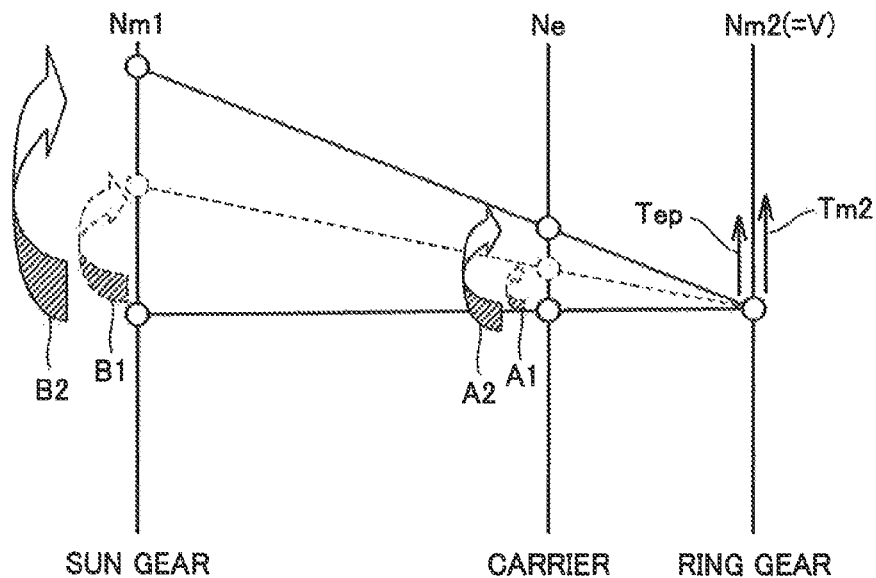
FIG. 2 is a nomographic chart when the vehicle is in a substantially stopped state.

FIG. 2 is a nomographic chart provided when the vehicle is in a substantially stopped state. The substantially stopped state indicates a state of vehicular speed V having an absolute value of substantially 0 (equal to or smaller than 1 km/h for example). As has been described above, engine speed Ne, first MG rotational speed Nm1, and second MG rotational speed Nm2 have a relationship connected by a straight line in the nomographic chart. Note that second MG 30 rotates in synchronization with driving wheel 80, and accordingly, second MG rotational speed Nm2 is in direct proportion to vehicular speed V.

In the substantially stopped state, a vehicle driving torque (a torque applied to rotate driving wheel 80) is determined by a second MG torque Tm2 (a torque transmitted to driving wheel 80 from second MG 22) and an engine directed torque Tep (a torque transmitted to driving wheel 80 via power split device 40 from engine 10).

Figure 3:
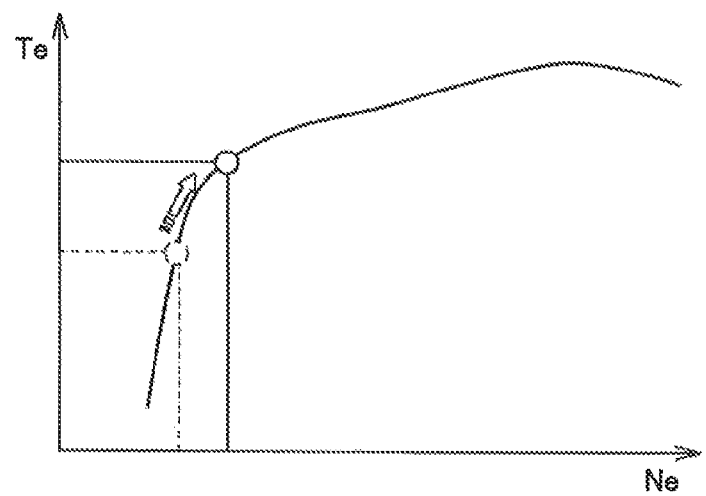
FIG. 3 represents a relationship between engine speed Ne and engine torque Te.

FIG. 3 represents a relationship between engine speed Ne and engine torque Te. As shown in FIG. 3, a range with relatively low engine speed Ne has a tendency to increase engine torque Te as engine speed Ne increases. Engine directed torque Tep is proportional to engine torque Te. Accordingly, increasing engine speed Ne can increase engine directed torque Tep (and hence the vehicle driving torque).

Returning to FIG. 2, when engine speed Ne is increased with the vehicle in the substantially stopped state (with second MG rotational speed Nm2 having a value of substantially 0), first MG 20 is also positively increased in accordance with engine speed Ne as they have the relationship shown in the nomographic chart. First MG 21 will generate electric power in accordance with engine speed Ne.

Accordingly, in a normal accelerator operation, engine speed Ne increases in a relatively small amount, and first MG rotational speed Nm1 also increases (or first MG 21 also generates electric power) in a relatively small amount (see FIG. 2, arrows A1 and B1).

In contrast, for an accelerator operation significantly larger than normal (e.g., an accelerator operation exceeding 70%, hereinafter also referred to as a "large accelerator operation"), engine speed Ne increases in a relatively large amount, and first MG rotational speed Nm1 also increases (or first MG 21 also generates electric power) in a relatively large amount. (see FIG. 2, arrows A2 and B2). More specifically, when the large accelerator operation is performed with the vehicle in the substantially stopped state, first MG 21 generates electric power in a rapidly increased amount. While the electric power generated by first MG 21 in such a rapidly increased amount must be consumed somewhere, the substantially stopped state has second MG rotational speed Nm2 of substantially 0, and it is not expected that second MG 22 consumes electric power (power consumption=rotational speed×torque, and accordingly, with a rotational speed of substantially 0, an increased torque does not contribute to significantly increased power consumption). Accordingly, it is desirable that the electric power generated by first MG 21 is charged to battery 70.

However, battery 70 receives electric power limited to a value smaller than receivable electric power value Win, as has been described above. Accordingly, if first MG 21 generates electric power exceeding battery 70's receivable electric power value Win (more strictly, if first MG 21 generates electric power exceeding a sum of battery 70's receivable electric power value Win and a loss caused when first MG 21 generates electric power), then there will be generated excessive electric power also unreceivable by battery 70. If such excessive electric power is eliminated (or the electric power generated by first MG 21 is held to be equal to or smaller than the sum of receivable electric power value Win and the loss caused when first MG 21 generates electric power) by suppressing increasing engine speed Ne (and hence increasing engine torque Te), then a torque requested by the user to drive the vehicle can no longer be output.

Accordingly, in the present embodiment, when the vehicle starts up a hill, which is a typical situation with the large accelerator operation performed with the vehicle in the substantially stopped state, or when that the large accelerator operation has been performed with the vehicle in the substantially stopped state has been detected, ECU 200 closes the relay internal to the EHC power supply 100 to energize the EHC. This allows excessively generated electric power to be consumed by EHC 140. This eliminates the necessity of suppressing increasing engine speed Ne (or increasing engine torque Te), as would be done when the EHC is not energized, and can thus prevent the vehicle from having impaired motive power performance (to start from the substantially stopped state). This is the most characteristic point of the present invention, When that the large accelerator operation has been performed with the vehicle in the substantially stopped state has been detected, the EHC is energized, as will be described hereinafter by way of example. Note that starting up a hill is a typical situation with the large accelerator operation performed with the vehicle in the substantially stopped state, and accordingly, a case with having detected that the large accelerator operation has been performed with the vehicle in the substantially stopped state can include a case with starting up a hill. If specifying starting up a hill is desired, however, adding a condition that the vehicle is on a hill suffices. Whether the vehicle is on a hill may be determined for example from acceleration G sensed by acceleration sensor 159. Furthermore, the EHC may be energized for a case with having detected that the vehicle starts up a hill, rather than the case with having detected that the large accelerator operation has been performed with the vehicle in the substantially stopped state. Whether the vehicle starts up a hill can be determined for example from acceleration G, amount A by which the accelerator pedal is operated, and vehicular speed V.

Figure 4:
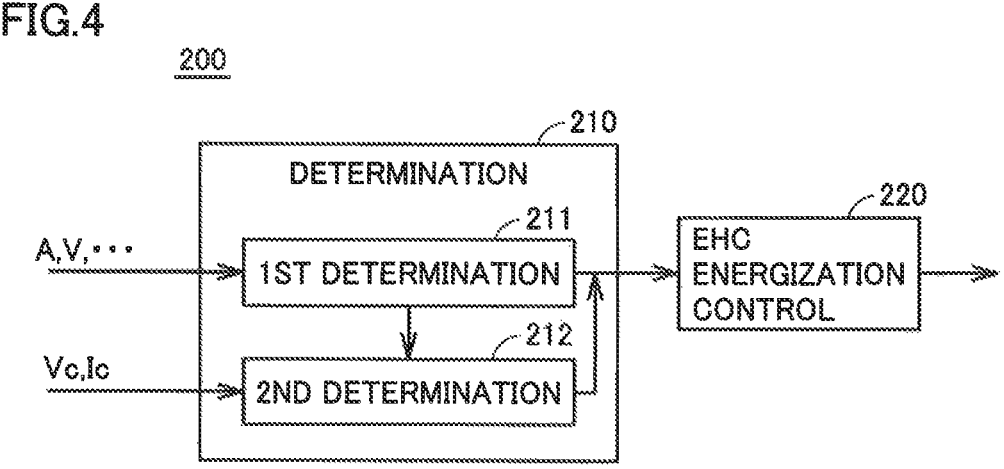
FIG. 4 is a functional block diagram of an ECU.

FIG. 4 is a functional block diagram of ECU 200. Note that each functional block shown in FIG. 4 may be implemented by hardware or software.

ECU 200 includes a determination unit 210 and an EHC energization control unit. 220. Determination unit 210 includes a first determination unit 211 and a second determination unit 212.

First determination unit 211 determines (or detects), based on amount A by which the accelerator pedal is operated and vehicular speed V, whether the large accelerator operation has been performed with the vehicle in the substantially stopped state. Determination unit 210 determines that the large accelerator operation has been performed with the vehicle in the substantially stopped state when vehicular speed V is lower than a threshold vehicular speed V0 (for example of 1 km/h) and the accelerator pedal is also operated in amount A exceeding a threshold amount A0 (for example of 70%).

If first determination unit 211 determines that the large accelerator operation has been performed with the vehicle in the substantially stopped state, second determination unit 212 refers to a history of energizing the EHC (a history of current Ic and voltage Vc) to estimate catalyst temperature Tc attained when the EHC is energized only for a reference energization period of time α, and second determination unit 212 determines (or estimates) whether catalyst temperature Tc is lower than a tolerable upper limit temperature Tmax. Note that reference energization period of time α is a period of time estimated to be required to allow vehicular speed V to reach a reference vehicular speed from a speed lower than threshold vehicular speed V0. The reference vehicular speed is a vehicular speed at which it can be expected that the electric power generated by first MG 21 can be consumed by second MG 22 without energizing the EHC. In other words, the vehicle is started and thereafter once reference energization period of time α has elapsed, it can be expected that the electric power generated by first MG 21 can be consumed by second MG 22 without energizing the EHC. Note that reference energization period of time α may be a fixed value previously obtained through an experiment or the like or may be a variable value depending on amount A by which the accelerator pedal is operated, vehicular speed V and/or the like.

EHC energization control unit 220 controls energizing the EHC based on a resultant determination of determination unit 210. If it is determined that the large accelerator operation has been performed with the vehicle in the substantially stopped state, and it is also estimated that catalyst temperature Tc is lower than tolerable upper limit temperature Tmax, EHC energization control unit 220 activates an energization timer (or starts measuring elapse of time). Then, before the energization timer reaches reference energization period of time α, EHC energization control unit 220 energizes the EHC, and once the energization timer has reached reference energization period of time α, EHC energization control unit 220 ceases energizing the EHC and resets the energization timer.

FIG. 5 is a flowchart of a procedure of a process done by ECU 200 to implement the above described function. This procedure is repeated periodically as predetermined.

In Step (hereinafter abbreviated as "S") 10, ECU 200 determines whether the energization timer is active.

If it is determined in S10 that the energization timer is not active (NO in S10), ECU 200 determines in S11 whether vehicular speed V is lower than threshold vehicular speed V0 and whether the accelerator pedal is also operated in amount A exceeding threshold amount A0 (i.e., whether the large accelerator operation has been performed with the vehicle in the substantially stopped state).

If ECU 200 does not determine that V<V0 and A>A0 (NO in S11), ECU 200 ends the process.

If V<V0 and A>A0 (YES in S11), ECU 200 sets reference energization period of time α in S12, estimates catalyst temperature Tc in S13, and determines in S14 whether catalyst temperature Tc is lower than tolerable upper limit temperature Tmax.

If catalyst temperature Tc exceeds tolerable upper limit temperature Tmax (NO in S14), ECU 200 ends the process.

If catalyst temperature Tc is lower than tolerable upper limit temperature Tmax (YES in S14), ECU 200 activates the energization timer.

If it is determined in S10 that the energization timer is active (YES in S10), ECU 200 determines in S16 whether the energization timer has reached reference energization period of time α.

If the energization timer has not reached reference energization period of time α (NO in S16), ECU 200 energizes the EHC in S17.

If the energization timer has reached reference energization period of time α (YES in S16), ECU 200 proceeds to S18 to cease energizing the EHC. ECU 200 thereafter resets the energization timer in S19.

Thus according to the present embodiment ECU 200 energizes the EHC when first MG 21 generates rapidly increased electric power as the vehicle starts up a hill or the large accelerator operation has been performed with the vehicle in the substantially stopped state. If first MG 21 generates rapidly increased electric power and excessive electric power is generated beyond receivable electric power value Win of battery 70, the excessive electric power can be consumed as energy to heat EHC 140. This eliminates the necessity of suppressing increasing engine speed Ne (or increasing engine torque Te), as would be done when the EHC is not energized, and can thus prevent the vehicle from having impaired motive power performance (to start from the substantially stopped state).

Furthermore, when the vehicle starts up a hill or the large accelerator operation has been performed with the vehicle in the substantially stopped state, the vehicle generates a large amount of exhaust gas, and accordingly, EHC 140 is required to have high purification performance. In the present embodiment, excessive electric power can be used to heat EHC 140, and if the catalyst has low temperature, the catalyst can be heated fast to a temperature to activate the catalyst. The vehicle can thus start up a hill while exhibiting better performance to purify exhaust gas.

Note that while the present embodiment has been described for energizing an EHC when a vehicle starts up a hill or a large accelerator operation has been performed with the vehicle in a substantially stopped state, alternatively the EHC may be energized when the vehicle starts up a hill or the large accelerator operation has been performed with the vehicle in the substantially stopped state and in addition when battery 70 has receivable electric power value Win smaller than a threshold value. This allows the EHC to be energized when there is a larger possibility of generating excessive electric power.

Furthermore, while in the present embodiment the present invention is applied to a typical hybrid vehicle, the present invention may be applied to a plug-in type hybrid vehicle that can charge battery 70 with electric power of an external power supply. Such a plug-in type hybrid vehicle has a tendency to have its engine stopped continuously for a longer period of time than the typical hybrid vehicle and has a larger necessity of warming up a catalyst than the typical hybrid vehicle, and it is particularly effective to apply the present invention thereto.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

REFERENCE SIGNS LIST

1: vehicle; 10: engine; 20: MG; 21: first MG; 22: second MG; 40: power split device; 50: speed reducer; 60: PCU; 70:

battery; 80: driving wheel; 100: power supply; 130: exhaust path; 140: EHC; 151: monitoring unit; 152: current sensor; 153: voltage sensor; 154: rotational speed sensor; 155, 156: resolver; 157: vehicular speed sensor; 158: accelerator pedal position sensor; 159: acceleration sensor; 200: ECU; 210: determination unit; 211: first determination unit; 212: second determination unit; 220: energization control unit.

The invention claimed is:

1. A vehicular control device for a vehicle including an engine, an electrically heatable catalyst device purifying exhaust gas of said engine, and a first rotating electric machine, said first rotating electric machine generating electric power in accordance with motive power of said engine for a low speed state with a vehicular speed being a speed lower than a first vehicular speed, the vehicular control device comprising:
   a relay switching an electrical connection state of said first rotating electric machine and said catalyst device; and
   an electronic control unit controlling said relay to control energizing said catalyst device,
   wherein the electronic control unit is programmed to:
      responsive to determining that said vehicle is starting up a hill or in said low speed state when an accelerator is operated in an amount exceeding a threshold amount to perform an accelerator operation, estimate a temperature of a catalyst attained when said catalyst device is energized for a reference period of time,
      responsive to said estimate indicating that said catalyst would attain a temperature lower than a tolerable temperature, energize said catalyst device, and
      responsive to said estimate indicating that said catalyst would attain a temperature exceeding said tolerable temperature, avoid energizing said catalyst device.

2. The vehicular control device according to claim 1, wherein:
   said vehicle further includes a second rotating electric machine coupled with a driving shaft and having a rotational speed proportional to the vehicular speed;
   said reference period of time is a period of time estimated to be required to allow the vehicular speed to reach a second vehicular speed from said speed lower than said first vehicular speed; and
   said second vehicular speed is set to a value for which it is estimated that it is unnecessary to pass electric power that is generated by said first rotating electric machine to said catalyst device as the electric power generated by said first rotating electric machine is consumable by said second rotating electric machine.

3. The vehicular control device according to claim 1, wherein:
   said vehicle further includes a power storage device capable of transmitting and receiving electric power to and from said first rotating electric machine; and
   wherein said electronic control unit is programmed to energize said catalyst device when said vehicle starts up a hill or in said low speed state said accelerator operation is performed and said power storage device also has a receivable electric power value smaller than a threshold electric power value.

4. The vehicular control device according to claim 1, wherein said vehicle further includes a planetary gear device including a ring gear coupled with a driving shaft, a sun gear coupled with said first rotating electric machine, a pinion gear engaging with said sun gear and said ring gear, and a carrier coupled with said engine and supporting said pinion gear rotatably.

5. A vehicular control method performed by a vehicular control device for a vehicle including an engine, an electrically heatable catalyst device purifying exhaust gas of said engine, a first rotating electric machine coupled with said engine, and a relay switching a connection state of said first rotating electric machine and said catalyst device, said first rotating electric machine generating electric power in accordance with motive power of said engine for a low speed state with a vehicular speed being a speed lower than a first vehicular speed, the method comprising the steps of:
   determining whether said vehicle starts up a hill or whether in said low speed state an accelerator is operated in an amount exceeding a threshold amount to perform an accelerator operation; and
   responsive to determining that said vehicle is starting up a hill or in said low speed state said accelerator operation is performed, estimating a temperature of a catalyst attained when said catalyst device is energized for a reference period of time,
   responsive to said estimate indicating that said catalyst would attain a temperature lower than a tolerable temperature, controlling said relay to energize said catalyst device; and
   responsive to said estimate indicating that said catalyst would attain a temperature exceeding said tolerable temperature, controlling said relay to avoid energizing said catalyst device.

* * * * *